US010717177B2

(12) United States Patent
Dembeck

(10) Patent No.: US 10,717,177 B2
(45) Date of Patent: Jul. 21, 2020

(54) FASTENER ALIGNMENT TOOLS AND METHODS OF UTILIZING THE SAME

(71) Applicant: The Boeing Company, Chicago, IL (US)

(72) Inventor: David M. Dembeck, Puyallup, WA (US)

(73) Assignee: The Boeing Company, Chicago, IL (US)

( * ) Notice: Subject to any disclaimer, the term of this patent is extended or adjusted under 35 U.S.C. 154(b) by 128 days.

(21) Appl. No.: 15/725,615

(22) Filed: Oct. 5, 2017

(65) Prior Publication Data
US 2019/0105764 A1 Apr. 11, 2019

(51) Int. Cl.
*B25B 31/00* (2006.01)
*B64F 5/10* (2017.01)
*B25B 23/00* (2006.01)

(52) U.S. Cl.
CPC ............ *B25B 31/00* (2013.01); *B25B 23/005* (2013.01); *B64F 5/10* (2017.01)

(58) Field of Classification Search
CPC ......... B25B 31/00; B25B 29/00; B25B 11/00; B25B 11/02; B25H 3/003; B25H 3/04; B25H 3/06; B25H 7/02; B64F 5/10; B25C 11/00; B25C 11/02; B25C 3/00; B25C 3/002; B25C 3/006; B23C 3/00; B23C 3/002; B23B 47/287
USPC ............................................ 29/271; 269/900
See application file for complete search history.

(56) References Cited

U.S. PATENT DOCUMENTS

| | | | | |
|---|---|---|---|---|
| 5,096,061 A | * | 3/1992 | Wakai | F16B 15/08 206/347 |
| 5,255,799 A | * | 10/1993 | Haynes | A63D 15/10 211/68 |
| 6,012,497 A | * | 1/2000 | Stottmann | B27F 1/12 144/144.1 |
| 6,637,606 B1 | * | 10/2003 | Chen | B25H 3/04 206/372 |
| D489,960 S | * | 5/2004 | Grendahl | B27F 1/12 D8/354 |

(Continued)

*Primary Examiner* — Orlando E Aviles
*Assistant Examiner* — Robert F Neibaur
(74) *Attorney, Agent, or Firm* — Dascenzo Intellectual Property Law, P.C.

(57) ABSTRACT

Fastener alignment tools and methods of utilizing the same are disclosed herein. The fastener alignment tools are configured to operatively engage a plurality of fasteners with a corresponding plurality of fastening locations and include a gripping region and an alignment tool body. The alignment tool body defines a plurality of fastener-receiving regions. Each fastener-receiving region includes a fastener receptacle, which is configured to receive a corresponding fastener in a received orientation relative to the alignment tool body, and a fastener retention structure, which is configured to retain the corresponding fastener within the fastener-receiving region at a retained orientation relative to the alignment tool body. The methods include positioning each fastener of the plurality of fasteners within a corresponding fastener-receiving region, retaining each fastener within the corresponding fastener-receiving region, orienting the fastener alignment tool relative to the plurality of fastening locations, and simultaneously releasing each fastener.

24 Claims, 9 Drawing Sheets

(56) References Cited

U.S. PATENT DOCUMENTS

| | | | | |
|---|---|---|---|---|
| 6,889,414 B2* | 5/2005 | Korsedal | ............... | B25B 23/00 |
| | | | | 29/271 |
| 7,648,029 B2* | 1/2010 | Chen | ............... | A47F 5/0006 |
| | | | | 206/376 |
| 7,934,971 B2* | 5/2011 | Mimlitch, III | ......... | A63H 33/12 |
| | | | | 446/102 |
| 8,784,939 B2* | 7/2014 | Romero | ............... | A43D 5/02 |
| | | | | 101/134.5 |
| 2005/0017003 A1* | 1/2005 | Sullivan | ............... | B25H 3/003 |
| | | | | 220/23.4 |
| 2005/0084344 A1* | 4/2005 | Dods | ............... | B23B 47/287 |
| | | | | 408/67 |

* cited by examiner

FASTENER ALIGNMENT TOOLS AND METHODS OF UTILIZING THE SAME

FIELD

The present disclosure relates generally to fastener alignment tools and methods of utilizing the same.

BACKGROUND

During assembly of complex structures, a large number of fasteners may be utilized to assemble various subassemblies thereof and/or to operatively attach two or more subassemblies together to form and/or define the complex structure. Historically, installation of these fasteners has proceeded sequentially, with a technician installing a first fastener at a first predetermined fastener location and tightening the first fastener to a predetermined torque before proceeding to install a subsequent fastener at a subsequent predetermined fastener location. This process may be repeated hundreds, or even thousands, of times and may be quite time-consuming. In addition, and in certain applications, such as when the structures include aircraft, fastener installation may be spatially constrained and/or ergonomically challenging, making it difficult for the technician to install certain fasteners. In addition, loss of fasteners within the aircraft may be unacceptable. Thus, the technician may be required to search for, and find, any dropped fastener before proceeding to install the subsequent fastener. Thus, there exists a need for fastener alignment tools and methods of utilizing the same.

SUMMARY

Fastener alignment tools and methods of utilizing the same are disclosed herein. The fastener alignment tools are configured to operatively engage a plurality of fasteners with a corresponding plurality of fastening locations arranged in a predetermined fastening location pattern on a structure and include a gripping region and an alignment tool body. The gripping region is configured to be operatively gripped by a user of the fastener alignment tool. The alignment tool body defines a plurality of fastener-receiving regions arranged in a predetermined fastener-receiving region pattern. The predetermined fastener-receiving region pattern corresponds to the predetermined fastening location pattern. Each fastener-receiving region is configured to receive and retain a corresponding fastener and includes a fastener receptacle configured to receive the corresponding fastener in a received orientation relative to the alignment tool body. Each fastener-receiving region also includes a fastener retention structure configured to retain the corresponding fastener within the fastener-receiving region at a retained orientation relative to the alignment tool body. The retained orientation is distinct from the received orientation.

The methods include methods of engaging a plurality of fasteners with a corresponding plurality of fastening locations arranged in a predetermined fastening location pattern on a structure. The methods include positioning each fastener of the plurality of fasteners within a corresponding fastener-receiving region of a fastener alignment tool. The methods also include retaining each fastener within the corresponding fastener-receiving region and orienting the fastener alignment tool relative to the plurality of fastening locations such that each fastener contacts a corresponding fastening location of the plurality of fastening locations. The methods further include releasing each fastener from the corresponding fastener-receiving region such that each fastener remains engaged with the corresponding fastening location.

DESCRIPTION

Figure 1:
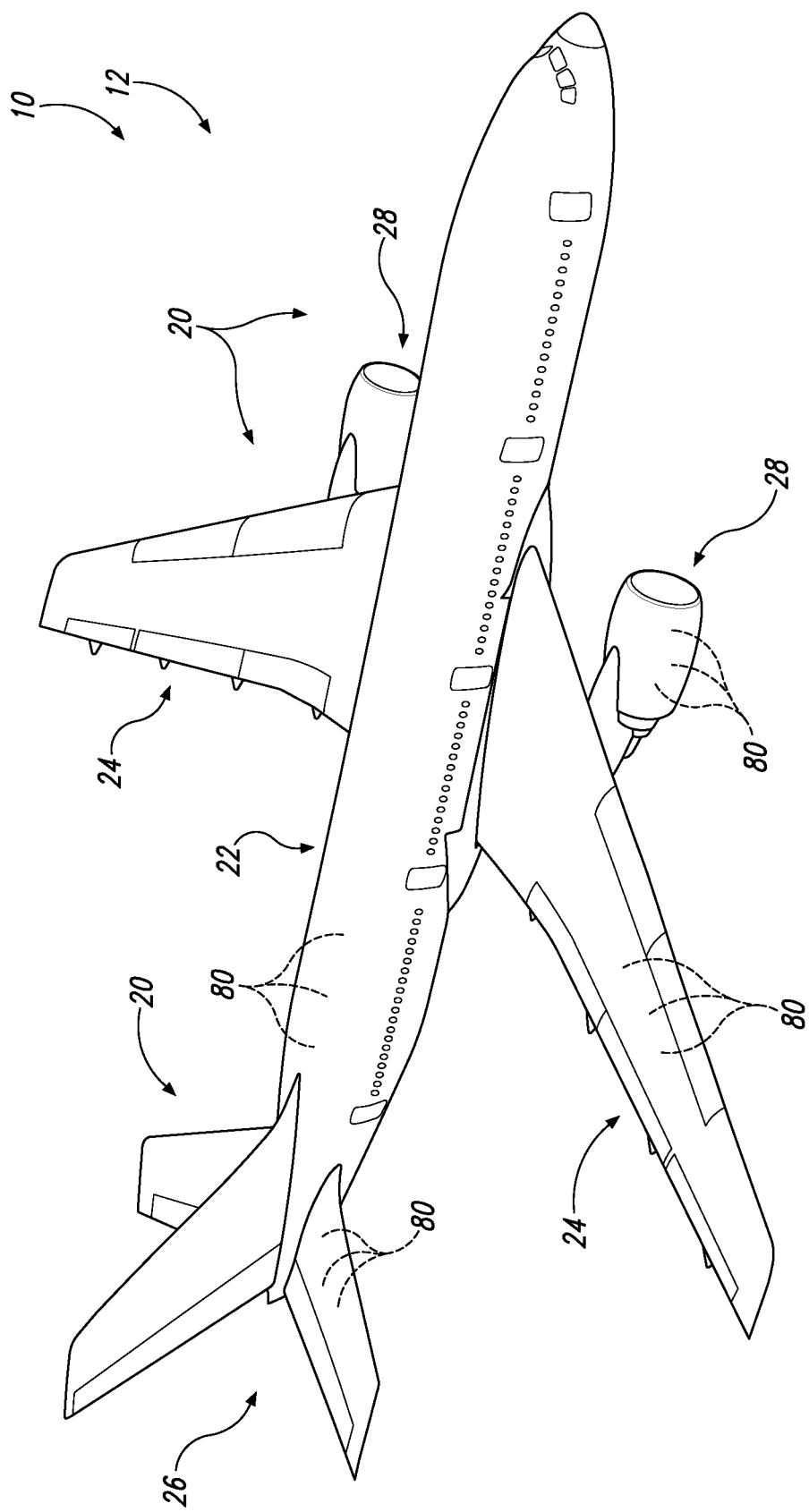
FIG. 1 is schematic representation of a structure that may be assembled utilizing the fastener alignment tools and/or methods, according to the present disclosure.

FIGS. 1-16 provide illustrative, non-exclusive examples of fastener alignment tools 100 and/or of methods 200, according to the present disclosure. Elements that serve a similar, or at least substantially similar, purpose are labeled with like numbers in each of FIGS. 1-16, and these elements may not be discussed in detail herein with reference to each of FIGS. 1-16. Similarly, all elements may not be labeled in each of FIGS. 1-16, but reference numerals associated therewith may be utilized herein for consistency. Elements, components, and/or features that are discussed herein with reference to one or more of FIGS. 1-16 may be included in and/or utilized with any of FIGS. 1-16 without departing from the scope of the present disclosure.

In general, elements that are likely to be included in a given (i.e., a particular) embodiment are illustrated in solid lines, while elements that are optional to a given embodiment are illustrated in dashed lines. However, elements that are shown in solid lines are not essential to all embodiments, and an element shown in solid lines may be omitted from a particular embodiment without departing from the scope of the present disclosure.

FIG. 1 is schematic representation of a structure 10, in the form of an aircraft 12, that may be assembled utilizing the fastener alignment tools and/or methods, according to the present disclosure. Structure 10 may include a plurality of subassemblies 20, and these subassemblies may be internally assembled and/or may be operatively attached to one another utilizing a plurality of fasteners 80. As an example, and when structure 10 includes aircraft 12, the aircraft may include an airframe 22, wings 24, a tail 26, and/or engines 28 that may be internally assembled with fasteners 80 and/or that may be operatively attached to one another utilizing fasteners 80.

Figure 2:
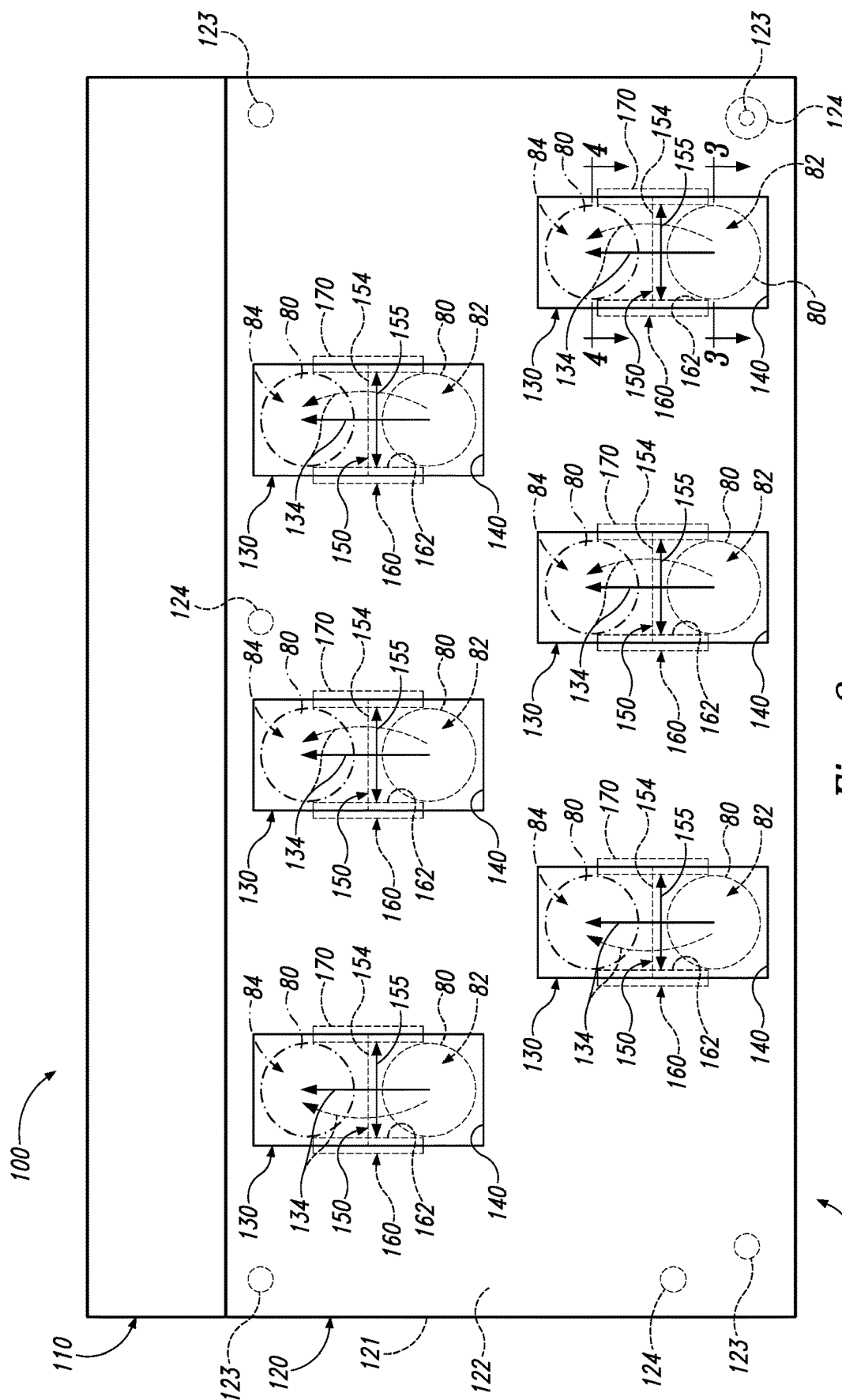
FIG. 2 is a schematic representation of fastener alignment tools according to the present disclosure.
Figure 3:
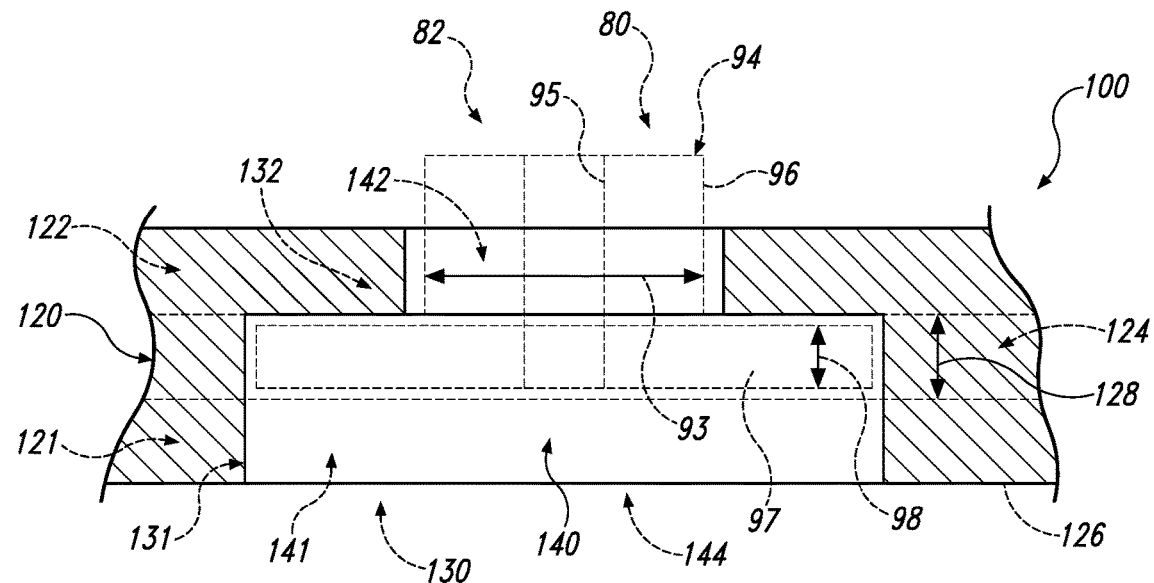
FIG. 3 is a schematic cross-sectional view of the fastener alignment tools of FIG. 2 taken along line 3-3 in FIG. 2.
Figure 4:
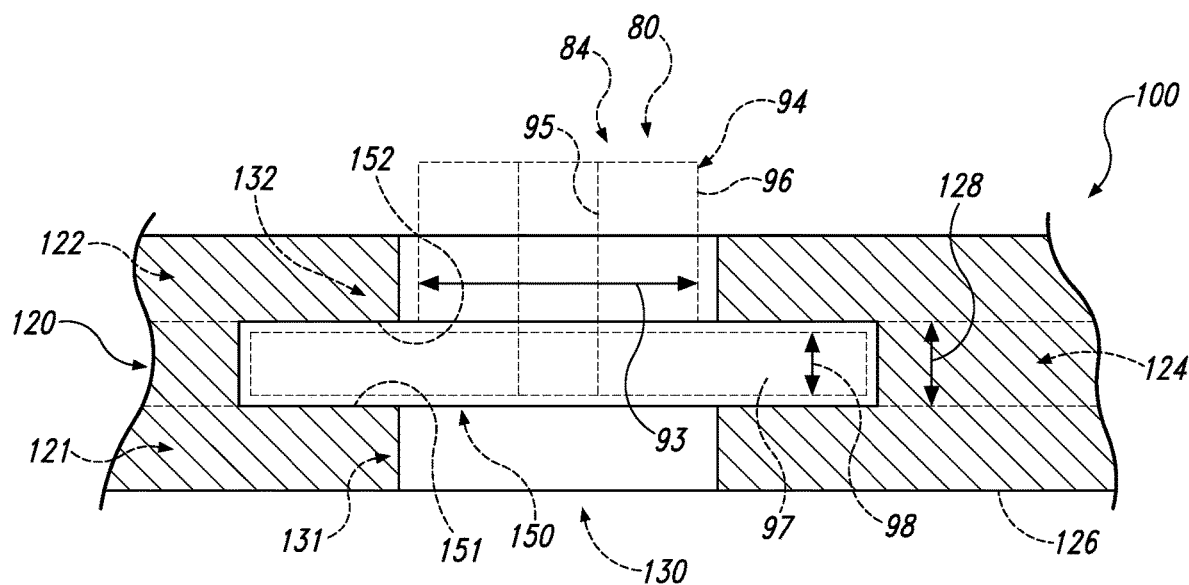
FIG. 4 is a schematic cross-sectional view of the fastener alignment tools of FIG. 2 taken along line 4-4 in FIG. 2.

FIG. 2 is a schematic representation of fastener alignment tools 100 according to the present disclosure. FIG. 3 is a schematic cross-sectional view of fastener alignment tool 100 of FIG. 2 taken along line 3-3 in FIG. 2, and FIG. 4 is a schematic cross-sectional view of fastener alignment tool 100 of FIG. 2 taken along line 4-4 in FIG. 2. FIGS. 5-8 illustrate various views of a less schematic example of a fastener alignment tool 100 according to the present disclosure. Fastener alignment tools 100 are configured to operatively engage a plurality of fasteners with a corresponding plurality of fastening locations arranged in a predetermined fastening location pattern 92 on a structure 10, as illustrated in FIGS. 12-16 and discussed in more detail herein with reference thereto.

As illustrated collectively by FIGS. 2-8, fastener alignment tools 100 include an alignment tool body 120 that defines a plurality of fastener-receiving regions 130. The plurality of fastener-receiving regions 130 is arranged in a predetermined fastener-receiving region pattern 136 that corresponds to, or matches, the predetermined fastening location patter of the plurality of fastening locations on the structure.

As illustrated in FIG. 2, each fastener-receiving region 130 is configured to receive a corresponding fastener 80 of the plurality of fasteners and includes a fastener receptacle 140 and a fastener retention structure 150. Fastener receptacle 140 is configured to receive corresponding fastener 80 at a received orientation 82 relative to alignment tool body 120. Fastener retention structure 150 is configured to retain corresponding fastener 80 at a retained orientation 84 relative to alignment tool body 120. Received orientation 82 is different, distinct, and/or at least partially spaced-apart from retained orientation 84, as illustrated.

Figure 5:
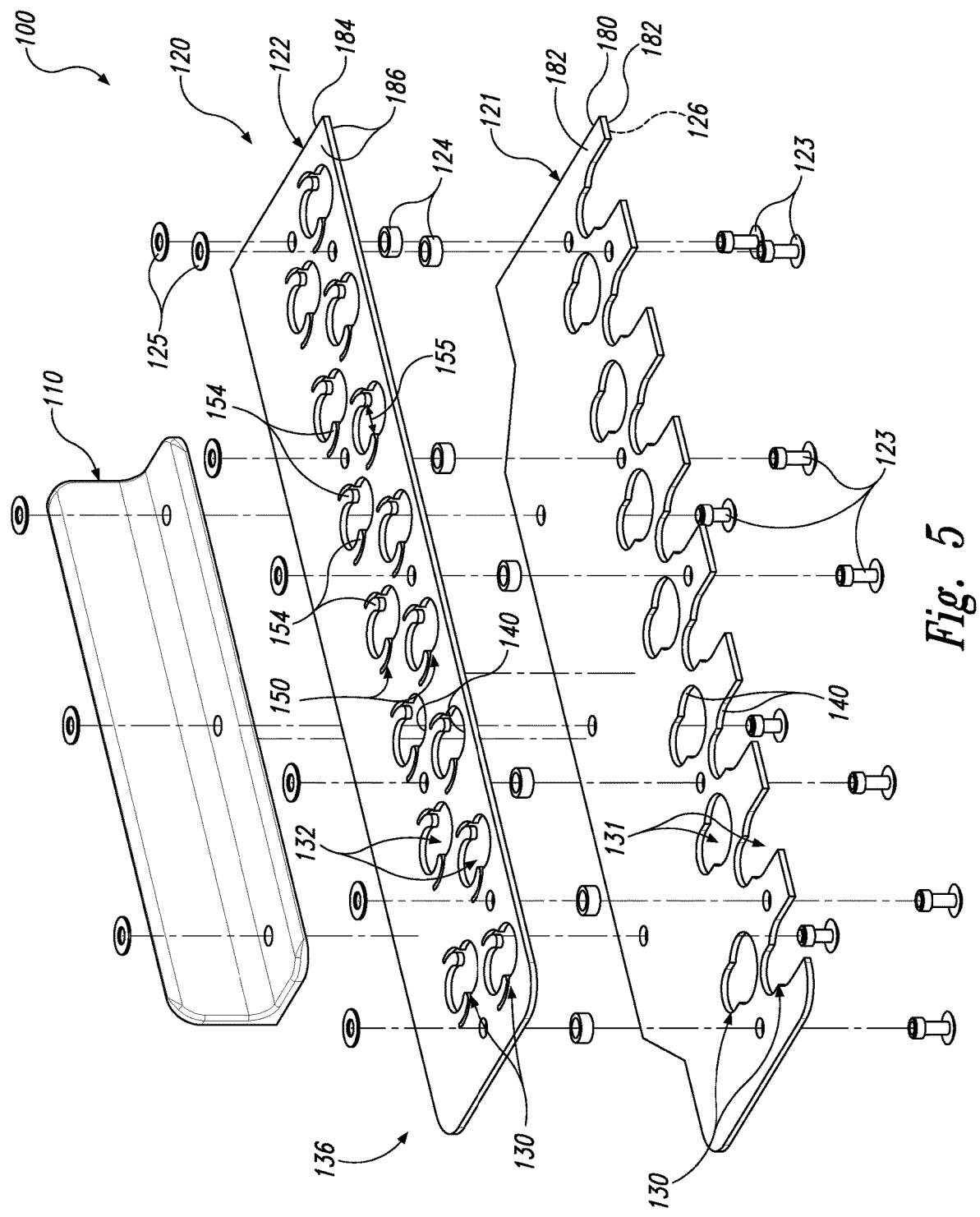
FIG. 5 is a less schematic exploded view of a fastener alignment tool according to the present disclosure.
Figure 6:
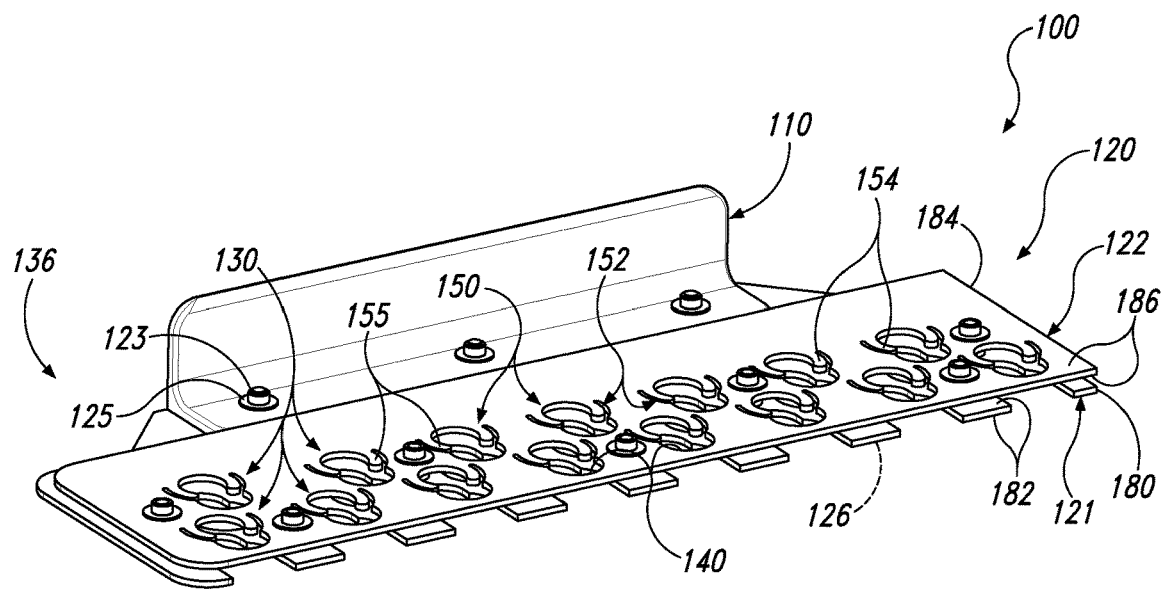
FIG. 6 is an assembled view of the fastener alignment tool of FIG. 5.
Figure 7:
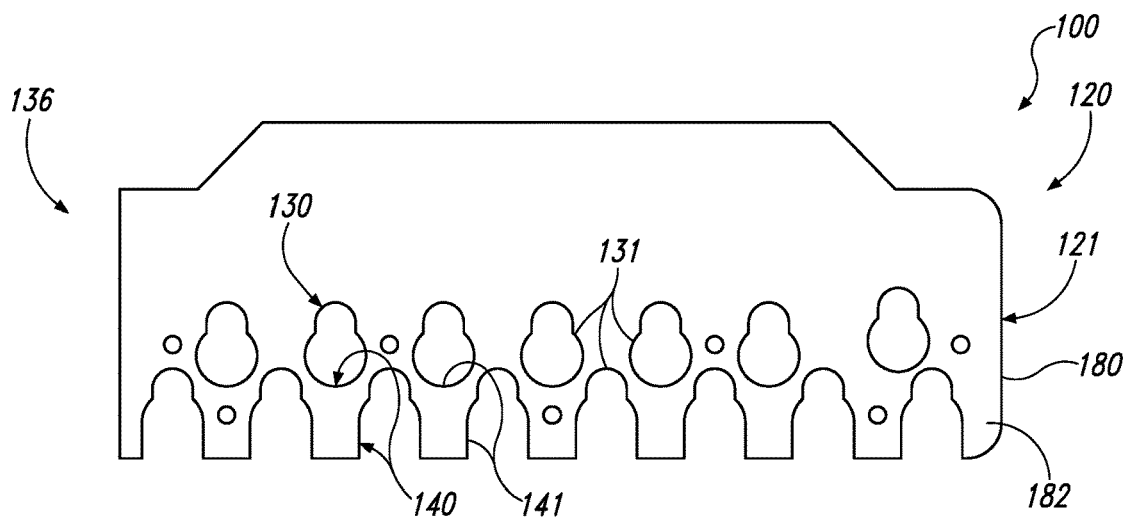
FIG. 7 is a top view of a first component of the fastener alignment tool of FIGS. 5-6.
Figure 8:
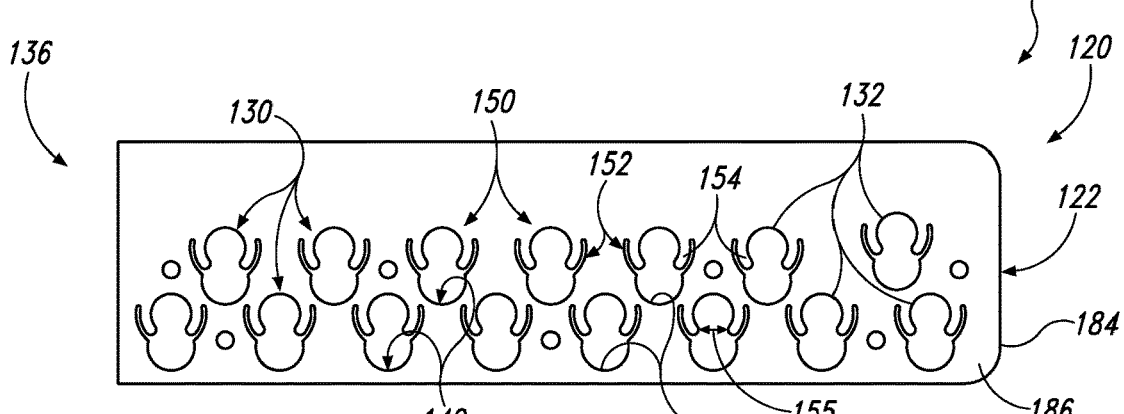
FIG. 8 is a top view of a second component of the fastener alignment tool of FIGS. 5-6.

As illustrated in FIGS. 2 and 5-6, fastener alignment tools 100 generally will include and/or define a gripping region 110. Gripping region 110 is configured to be operatively gripped by a user of fastener alignment tool 100 when the fastener alignment tool is utilized to engage the plurality of fasteners 80 with the corresponding plurality of fastening locations.

Figure 9:
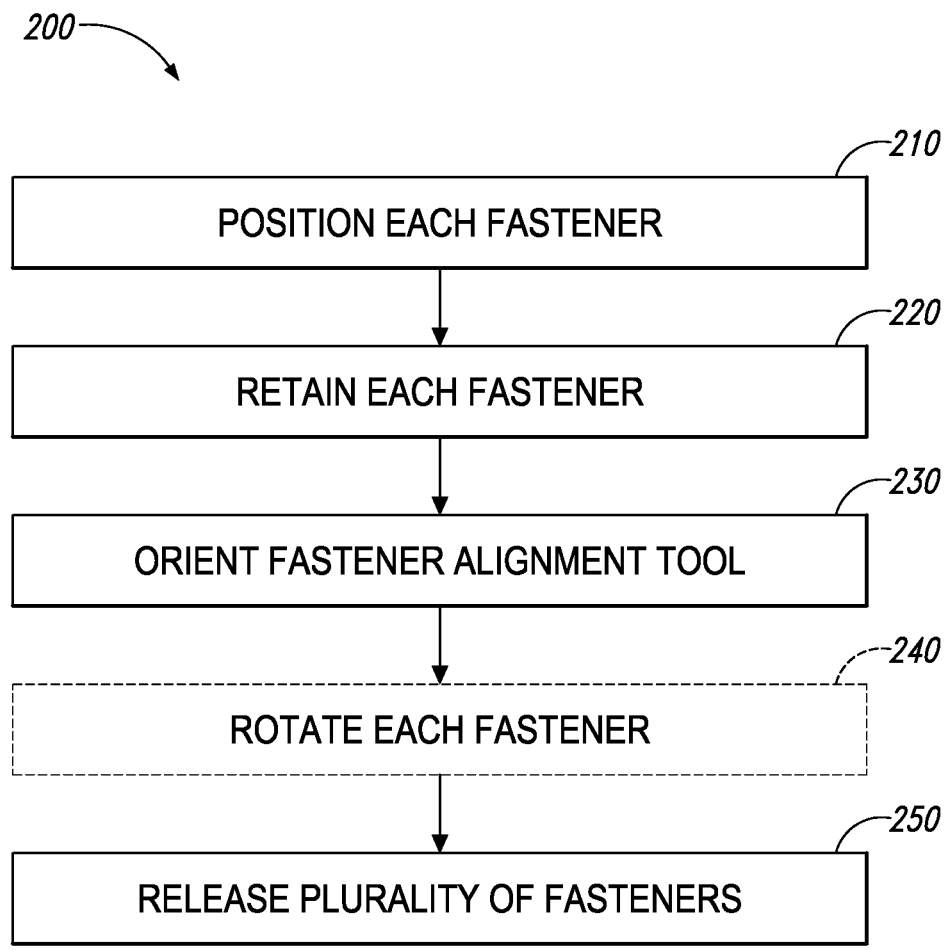
FIG. 9 is a flowchart depicting methods, according to the present disclosure, of engaging a plurality of fasteners with a corresponding plurality of fastener locations.

During operation and/or utilization of fastener alignment tools 100, and as discussed in more detail herein with reference to methods 200 of FIG. 9, fasteners 80 may be received, within fastener alignment tool 100, in received orientation 82. Subsequently, fasteners 80 may be transitioned to retained orientation 84 and retained within the fastener alignment tool with, via, and/or utilizing fastener retention structure 150. Fastener alignment tool 100 then may be oriented, relative to a corresponding plurality of fastening locations, such that each fastener 80 contacts a corresponding fastening structure. Fasteners 80 then may be released from corresponding fastener-receiving regions 130 while remaining engaged with the corresponding fastening structure.

Alignment tool body 120 may include any suitable structure that may form and/or define the plurality of fastener-receiving regions 130, fastener receptacles 140, and/or fastener retention structures 150. Additionally or alternatively, alignment tool body may include any suitable structure that may receive fasteners 80 at received orientation 82 and/or that may retain fasteners 80 at retained orientation 84, as illustrated in FIG. 2.

As an example, alignment tool body 120 may include and/or be a unitary, or monolithic, alignment tool body. As another example, alignment tool body 120 may include and/or be an assembly of a plurality of distinct, or separately formed, alignment tool body components. As an example, and as discussed in more detail herein, alignment tool body 120 may include at least a first component 121 and a second component 122.

It is within the scope of the present disclosure that alignment tool body 120 may be formed and/or defined in any suitable manner. As examples, alignment tool body 120 may be formed and/or defined utilizing one or more of a machining operation, a subtractive machining operation, an additive manufacturing operation, and/or a water jet cutting operation.

Similarly, alignment tool body 120 may be formed and/or defined from and/or by any suitable material and/or materials. As examples, alignment tool body 120 may be formed from a polymeric material, a metallic material, a resilient material, a stiff material, a low-friction material, a polyethylene, and/or ultra-high-molecular-weight polyethylene.

Fastener-receiving regions 130 may include any suitable structure that may be arranged in the predetermined fastener-receiving region pattern and/or that may be adapted, configured, designed, sized, and/or constructed to receive and/or to retain the plurality of fasteners 80, as illustrated in FIG. 2. As an example, fastener-receiving regions 130 may include specially shaped and/or sized openings and/or receptacles within alignment tool body 120.

It is within the scope of the present disclosure that fastener alignment tools 100, which are disclosed herein, may include any suitable number of fastener-receiving regions 130, each including a corresponding fastener receptacle 140 and a corresponding fastener retention structure 150. As examples, fastener alignment tools 100 may include at least 5, at least 10, at least 20, at least 30, at least 40, at least 50, at least 60, at least 70, at least 80, at most 200, at most 180, at most 160, at most 140, at most 120, at most 100, at most 80, and/or at most 60 distinct fastener-receiving regions 130.

Each fastener-receiving region 130 may be coplanar, or at least substantially coplanar, with each other fastener-receiving region 130 in the plurality of fastener-receiving regions. Stated another way, fastener receptacle 140 of each fastener-receiving region 130 may be coplanar, or at least substantially coplanar, with the fastener receptacle of each other fastener-receiving region 130. Stated yet another way, received orientation 82 of each fastener 80 may be coplanar, or at least substantially coplanar, with received orientation 82 of each other fastener 80. Stated another way, retained orientation 84 of each fastener 80 may be coplanar, or at least substantially coplanar, with retained orientation 84 of each other fastener 80.

Fastener receptacles 140 may include any suitable structure that may be adapted, configured, designed, sized, and/or constructed to receive fasteners 80 at received orientation 82. As an example, alignment tool body 120 may have and/or define a structure-facing surface 126, as perhaps illustrated most clearly in FIGS. 3-4. Structure-facing surface 126 may face toward the structure when the fastener alignment tool operatively engages the plurality of fasteners with the plurality of fastening locations and may define a fastener receptacle opening 144 that is shaped and/or sized to receive the fastener into the fastener receptacle.

Fastener retention structures 150 may include any suitable structure that may be adapted, configured, designed, sized, and/or constructed to retain fasteners 80 at retained orientation 84. As an example, fastener retention structures 150 may be configured to operatively engage with corresponding fasteners 80 as the corresponding fastener transitions from the received orientation to the retained orientation. As another example, fastener retention structures 150 may be configured to deform, or flex, to permit the corresponding fastener to transition from the received orientation to the retained orientation. As yet another example, fastener retention structures 150 may be configured to frictionally retain the corresponding fastener in the retained orientation. Examples of fastener retention structure 150 include a resilient tab, a resilient clip 156, two opposed resilient tabs, and/or two opposed resilient clips.

As illustrated in FIG. 2, each fastener-receiving region 130 may have and/or define a corresponding fastener trajectory 134, which the corresponding fastener 80 follows upon transitioning between received orientation 82 and retained orientation 84. It is within the scope of the present disclosure that fastener trajectories 134 may be parallel, at least substantially parallel, equal in length, and/or at least substantially equal in length for each fastener-receiving region 130.

In addition, fastener trajectories 134 may have any suitable shape. As examples, fastener trajectories 134 may be linear, or at least substantially linear, as illustrated in solid lines. As additional examples, fastener trajectories 134 may be arcuate, and/or at least substantially arcuate, as illustrated in dashed lines.

The plurality of fasteners 80 may include any suitable fastener that may operatively engage with corresponding fastening locations, that may be received within the alignment tool body in the received orientation, and/or that may be retained within the alignment tool body in the retained orientation. As examples, fasteners 80 may include one or more threaded fasteners, nuts, flange nuts, bolts, and/or flange bolts. It is within the scope of the present disclosure that the plurality of fasteners may have any suitable size and/or relative dimension. As an example, each fastener in the plurality of fasteners may be the same size, may be at least substantially the same size, and/or may have the same nominal size. As another example, a size of at least one fastener in the plurality of fasteners may differ from a size of at least one other fastener in the plurality of fasteners.

The plurality of fastening locations may include any suitable fastening location that may operatively engage with fasteners 80, that may be defined by the structure, and/or that may be operatively attached to the structure. As examples, the plurality of fastening locations may include a plurality of threaded locations, a plurality of posts, a plurality of threaded studs, a plurality of holes, and/or a plurality of threaded holes.

As discussed, alignment tool body 120 may include an assembly of a plurality of distinct alignment tool body components including at least first component 121 and second component 122. Under these conditions, first component 121 may form and/or define a first portion 131 of each fastener-receiving region 130 and second component 122 may form and/or define a second portion 132 of each fastener-receiving region 130, as illustrated in FIGS. 3-5. First portion 131 of fastener-receiving regions 130 may define, or may be referred to herein as defining, a first portion 141 of fastener receptacle 140, as illustrated in FIG. 3, and a first portion 151 of fastener retention structure 150, as illustrated in FIG. 4. Similarly, second portion 132 of fastener-receiving regions 130 may define, or may be referred to herein as defining, a second portion 142 of fastener receptacle 140, as illustrated in FIG. 3, and a second portion 152 of fastener retention structure 150, as illustrated in FIG. 4.

As illustrated in FIGS. 2 and 5-6, alignment tool body 130 may include a plurality of body couplers 123. Body couplers 123, when present, may operatively attach first component 121 and second component 122 to one another.

As illustrated in FIGS. 2-5, alignment tool body 120 also may include at least one spacer 124, which may extend between first component 121 and second component 122. Stated another way, spacer 124, when present, may be configured to maintain first component 121 and second component 122 spaced-apart from one another. Spacer 124, when present, may be operatively attached to first component 121 and/or to second component 122 with, via, and/or utilizing body couplers 123.

As discussed, the plurality of fasteners 80 may include a plurality of flange nuts. An example of a flange nut is illustrated in FIGS. 3-4 and indicated at 94. Flange nuts 94 may include a threaded receptacle 95, which may be configured to receive a corresponding fastening location therein. Flange nuts 94 also may include a nut region 96, which surrounds the threaded receptacle, and a flange region 97, which extends from nut region 96 and defines a flange thickness 98.

As illustrated in FIG. 3, flange nut 94 initially may be received within alignment tool body 120 in received orientation 82. As an example, flange nut 94 may be inserted into a corresponding fastener receptacle 140 of a corresponding fastener-receiving region 130 via a corresponding fastener receptacle opening 144. This may be accomplished, for example, by moving the flange nut vertically upward through fastener receptacle opening 144 until the flange nut is in received orientation 82, as illustrated. To facilitate this motion of the flange nut, and as illustrated in FIG. 3, first portion 141 of fastener receptacle 140 may be sized to receive both nut region 96 and flange region 97 of flange nut 94. However, and as also illustrated in FIG. 3, second portion 142 of fastener receptacle 140 may be sized to receive nut region 96 and to resist motion of flange region 97 therethrough and/or therepast. Thus, fastener receptacles 140 may retain flange nuts 94 therewithin and/or may resist motion of flange nuts 94 from a side of the fastener receptacle that is opposed to fastener receptacle opening 144.

Subsequently, and as illustrated in FIG. 4, flange nut 94 may be transitioned to retained orientation 84. This may include moving and/or sliding flange nut 94 from received orientation 82 and along fastener trajectory 134, which is illustrated in FIG. 2, to retained orientation 84. As illustrated in FIG. 4, first portion 151 of fastener retention structure 150 may be sized to permit access to threaded receptacle 95, such as from structure-facing surface 126 of alignment tool body 120.

In addition, first portion 151 of fastener retention structure 150 also may be sized to resist motion of flange region 97 therethrough and/or therepast. Similarly, second portion 152 of fastener retention structure 150 may be sized to receive nut region 96 and to resist motion of flange region 97 therethrough and/or therepast. As such, and when flange nut 94 is in retained orientation 84, the flange nut is retained within a space, or gap 128, that extends between first component 121 and second component 122, as illustrated in FIGS. 3-4. This gap also may be referred to herein as an average separation distance 128 between first component 121 and second component 122, and average separation distance 128 may be equal to, or greater than, flange thickness 98. As examples, the average separation distance may be at least 105%, at least 110%, at least 115%, at least 120%, at least 125%, at most 125%, at most 120%, at most 115%, at most 110%, and/or at most 105% of flange thickness 98. Gap 128 may be defined by spacers 124.

In addition, first portion 151 and/or second portion 152 of fastener retention structure 150 is sized to resist motion of flange nut 94 between received orientation 82 and retained orientation 84. However, first portion 151 and/or second portion 152 may be adapted, configured, and/or sized to permit at least limited motion, or floating, of fasteners 80 while fasteners 80 are in retained orientation 84. Such a configuration may decrease a required tolerance of a location of fastener receiving regions 130 relative to fastening locations 90. As an example, and as discussed, this resistance to motion may be accomplished via deformation, at least partial deformation, and/or flexing of first portion 151 and/or of second portion 152 as the flange nut transitions between the received orientation and the retained orientation. As a more specific example, and as illustrated in FIGS. 2, 5-6, and 8, second portion 152 of fastener retention structure 150 may include a pair of opposed flexible clips 154. Opposed flexible clips 154 may deform, or flex, such as away from flange nut 94, when the flange nut transitions between the received orientation and the retained orientation. Additionally or alternatively, opposed flexible clips 154 may define a minimum separation distance 155 that is less than a width 93, as illustrated in FIGS. 3-4, of a portion of flange nut 94, such as nut region 96, that passes therebetween as the flange nut transitions between the received orientation and the retained orientation.

First component 121 and/or second component 122 may be formed from any suitable structure and/or structures. As an example, and as illustrated in FIGS. 5-8, first component 121 may be formed from a first sheet of material 180 that defines two opposed first sheet material surfaces 182 and second component 122 may be formed from a second sheet of material 184 that defines two opposed second sheet material surfaces 186. The first sheet of material and/or the second sheet of material may be unitary, or monolithic, structures.

Under these conditions, the first portion of each fastener-receiving region may extend between the two opposed first sheet material surfaces. Similarly, the second portion of each fastener-receiving region may extend between the two opposed second sheet material surfaces. When first component 121 and second component 122 are assembled within alignment tool body 120, the two opposed first sheet material surfaces and the two opposed second sheet material surfaces may be parallel, or at least substantially parallel, to one another.

As illustrated in dashed lines in FIG. 2, fastener-receiving regions 130 may include and/or define corresponding rotation-inducing structures 160. Rotation-inducing structure 160, when present, may be configured to rotate corresponding fastener 80 when the corresponding fastener transitions between the retained orientation and the received orientation and may include any suitable structure. As an example, rotation-inducing structure 160 may include a rotation-inducing surface 162 that frictionally engages with corresponding fastener 80 as the corresponding fastener transitions between retained orientation 84 and received orientation 82. Examples of rotation-inducing surface 162 include a roughened surface, a rubber surface, and/or a high-friction surface. Such a configuration may cause fasteners 80 to be at least partially threaded onto corresponding fastening locations as the fasteners are transitioned from retained orientation 84 and received orientation 82.

It is within the scope of the present disclosure that rotation-inducing structure 160, when present, may be configured to engage a first side of fastener 80 and that fastener alignment tools 100 further may include a low-friction surface 170 that operatively engages an opposed second side of the fastener as the fastener transitions between retained orientation 84 and received orientation 82. Examples of low-friction surface 170 include a smooth surface and a hard surface. Such a configuration may increase a potential for rotation-inducing structures 160 to thread fasteners 80 onto corresponding fastening locations.

Gripping region 110, when present, may be defined in any suitable manner. As examples, gripping region 110 may be operatively attached to alignment tool body 120, may extend from alignment tool body 120, and/or may be defined by alignment tool body 120.

FIGS. 5-8 collectively illustrate various views and/or components of an example, or an embodiment, of fastener alignment tools 100 according to the present disclosure. FIGS. 10-14, which are discussed in more detail herein, also illustrate this example of fastener alignment tools 100.

In the examples illustrated in FIGS. 5-8, first component 121 defines a plurality of first portions 131 of a plurality of corresponding fastener receiving regions 130. First portions 131 may be referred to herein as being interconnected holes, of differing sizes, connected by a transition region, or a slot. Additionally or alternatively, first portions 131 may be referred to herein as including two offset, interconnected, and/or at least partially circular regions. Additionally or alternatively, first portions 131 may be referred to herein as being at least partially keyhole-shaped.

Similarly, second component 122 defines a plurality of second portions 132 of fastener receiving regions 130. Second portions 132 may be referred to herein as being two interconnected holes, and fastener retention structure 150 may be referred to herein as including two arcuate and resilient clips that extend at least partially between the two interconnected holes and resist motion of a fastener, when present, between the two interconnected holes. Additionally or alternatively, second portions 132 may be referred to herein as including two offset, interconnected, and/or at least partially circular regions, and fastener retention structure 150 may be referred to herein as including the two arcuate and resilient clips that extend at least partially between the two circular regions and resist motion of the fastener, when present, between the two circular regions.

FIG. 9 is a flowchart depicting methods 200, according to the present disclosure, of engaging a plurality of fasteners with a corresponding plurality of fastener locations arranged in a predetermined fastening location pattern on a structure, while FIGS. 10-16 illustrate portions of the method of FIG. 9, including predetermined fastening location pattern 92. Methods 200 include positioning each fastener in a plurality of fasteners at 210 and retaining each fastener at 220. Methods 200 also include orienting a fastener alignment tool at 230, may include rotating each fastener at 240, and include releasing the plurality of fasteners at 250.

Positioning each fastener in the plurality of fasteners at 210 may include positioning each fastener within a corresponding fastener-receiving region of a fastener alignment tool. The positioning at 210 may include placing and/or positioning each fastener within a corresponding fastener receptacle of the corresponding fastener-receiving region. Additionally or alternatively, the positioning at 210 may include positioning each fastener at a receiving orientation relative to the fastener alignment tool.

Figure 10:
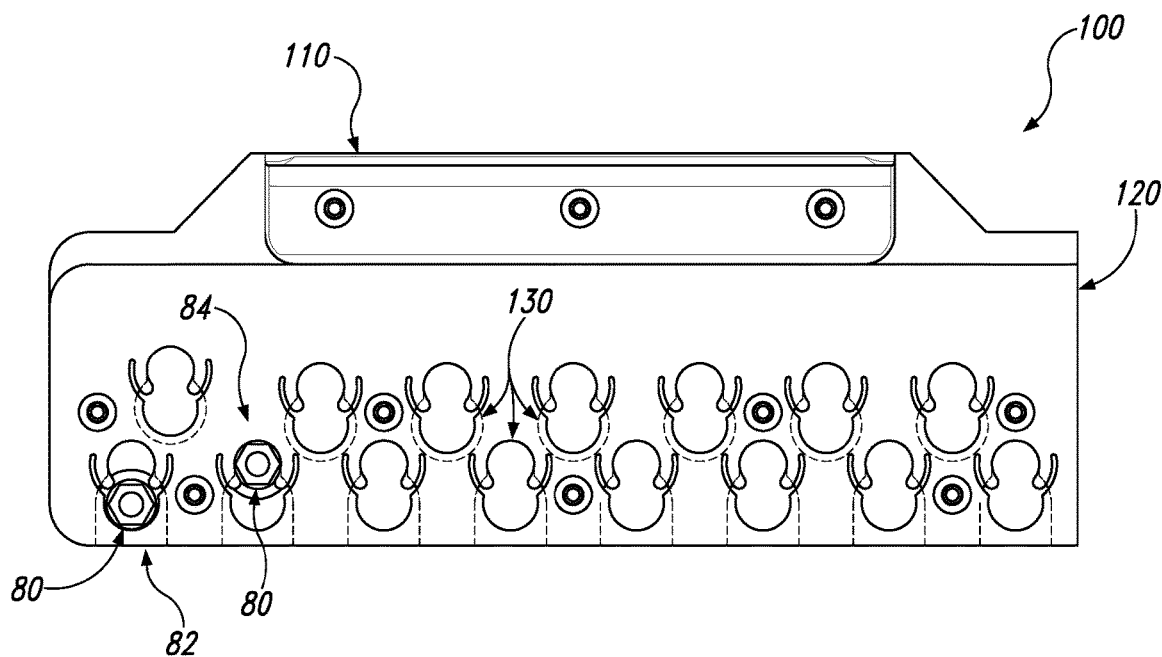
FIG. 10 is an illustration of a portion of the method of FIG. 9.
Figure 11:
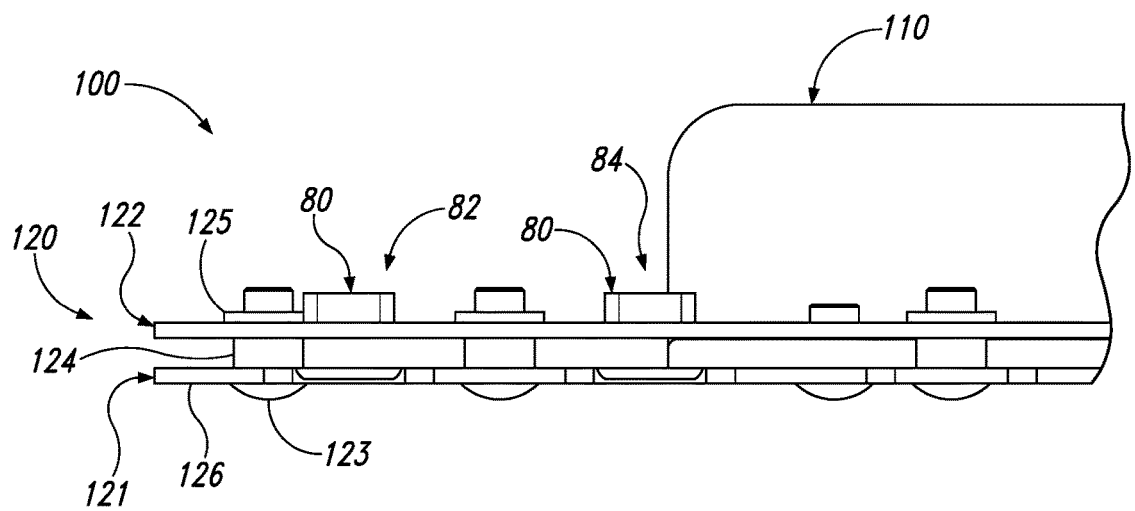
FIG. 11 is an illustration of a portion of the method of FIG. 9.

The positioning at 210 is illustrated in FIGS. 10-11. As illustrated by the leftmost fastener, fasteners 80 may be positioned within corresponding fastener-receiving regions 130 at a received orientation 82 relative to fastener alignment tool 100 and/or relative to alignment tool body 120 thereof.

Additional examples of the fastener alignment tool are disclosed herein with reference to fastener alignment tool 100 of FIGS. 2-8. Additional examples of the fastener-receiving region are disclosed herein with reference to fastener-receiving region 130 of FIGS. 2-8. Additional examples of the fastener receptacle are disclosed herein with reference to fastener receptacle 140 of FIGS. 2-3 and 5-8. Additional examples of the received orientation are disclosed herein with reference to received orientation 82 of FIGS. 2-3.

Retaining each fastener at 220 may include retaining each fastener within the corresponding fastener-receiving region. The retaining at 220 may include operatively translating each fastener, within the fastener alignment tool, from the received orientation to a retained orientation relative to the fastener alignment tool. Stated another way, and for each fastener in the plurality of fasteners, the positioning at 210 may be performed prior to the retaining at 220. The retained orientation is distinct, or spaced-apart, from the received orientation.

The retaining at 220 may include frictionally retaining each fastener with a corresponding fastener retention structure of the corresponding fastener-receiving region. Additionally or alternatively, the retaining at 220 may include deforming, or flexing, the corresponding fastener retention structure as each fastener transitions from the received orientation to the retained orientation.

Figure 12:
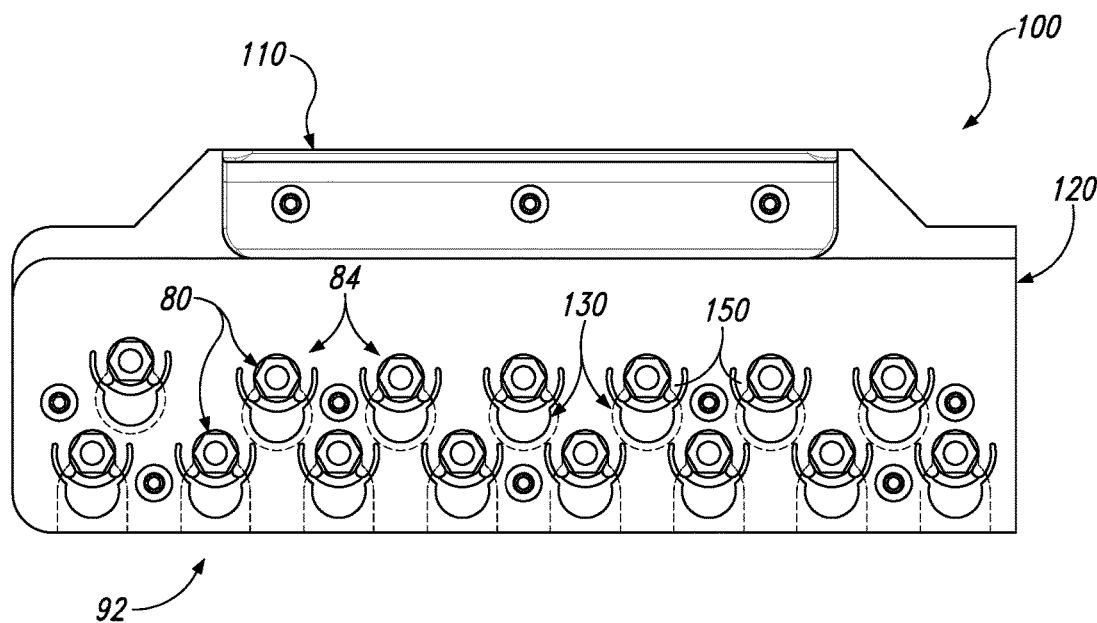
FIG. 12 is an illustration of a portion of the method of FIG. 9.

The retaining at 220 is illustrated in FIGS. 10-12. As illustrated in FIGS. 10-11, the retaining at 220 may include transitioning fasteners 80 from received orientation 82 to retained orientation 84. As illustrated in FIG. 12, and subsequent to performing the retaining at 220, each fastener 80 is retained, within fastener alignment tool 100, in retained orientation 84 by a corresponding fastener retention structure 150.

Additional examples of the retained orientation are disclosed herein with reference to retained orientation 84 of FIGS. 2 and 4. Additional examples of the fastener retention structure are disclosed herein with reference to fastener retention structure 150 of FIGS. 2, 4-6, and 8.

Orienting the fastener alignment tool at 230 may include orienting the fastener alignment tool relative to the plurality of fastening locations such that each fastener contacts a corresponding fastening location of the plurality of fastening locations. Stated another way, and subsequent to the orienting at 230, the plurality of fasteners may simultaneously contact the corresponding fastening locations. During the orienting at 230, each fastener in the plurality of fasteners may be in the retained orientation. Stated another way, the orienting at 230 may be performed subsequent to performing both the positioning at 210 and the retaining at 220 for each fastener in the plurality of fasteners.

Figure 13:
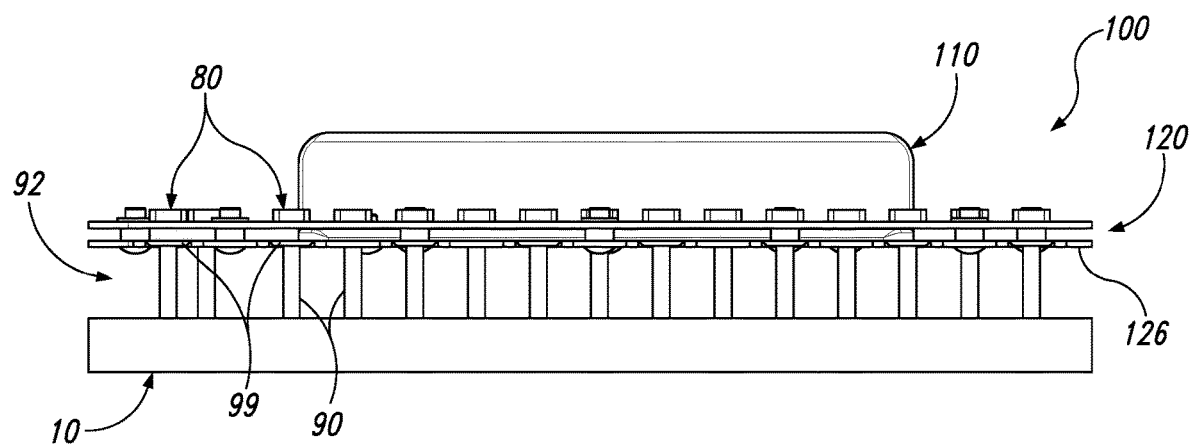
FIG. 13 is an illustration of a portion of the method of FIG. 9.

The orienting at 230 is illustrated in FIG. 13. As illustrated therein, the orienting at 230 may include operatively engaging each fastener 80 with the corresponding fastening location 90. Additionally or alternatively, the orienting at 230 may include at least partially coupling each fastener 80 to the corresponding fastening location 90. As also illustrated therein, fasteners 80 may include sealing structures 99, which may be configured to form a seal between the fasteners and structure 10 when the fasteners are tightened against structure 10. Sealing structures 99 may grip, or stretch around, fastening locations 90, thereby maintaining fasteners 80 operatively engaged with fastening locations 90 subsequent to the releasing at 250. Examples of sealing structures 99 include any suitable resilient seal, resilient ring, and/or O-ring.

Rotating each fastener at 240 may include rotating each fastener in the plurality of fasteners to engage each fastener with the corresponding fastening location and/or to tighten each fastener against the structure. The rotating at 240 may be performed with any suitable timing and/or sequence during methods 200. As an example, the rotating at 240 may be performed subsequent to the orienting at 230. As another example, the rotating at 240 may be performed prior to the releasing at 250. Under these conditions, the plurality of fasteners may be retained by the fastener alignment tool during the rotating at 240. As yet another example, the rotating at 240 may be performed subsequent to the releasing at 250. As another example, the rotating at 240 may be at least partially concurrent with the releasing at 250.

The rotating at 240 may include rotating in any suitable manner. As an example, the rotating at 240 may include utilizing a socket, a wrench, and/or any suitable drive tool to rotate each fastener in the plurality of fasteners. As another example, the rotating at 240 may include rotating with, via, and/or utilizing a rotation-inducing structure that forms a portion of the fastener alignment tool. Examples of the rotation-inducing structure are disclosed herein with reference to rotation-inducing structure 160 of FIG. 2. An example of the rotating at 240 is illustrated in the transition from FIG. 15, in which fasteners 80 are engaged with fastening locations 90, to FIG. 16, in which fasteners 80 are tightened against structure 10.

Releasing the plurality of fasteners at 250 may include releasing each fastener in the plurality of fasteners from the corresponding fastener-receiving region. This may include releasing such that each fastener remains engaged with the corresponding fastening location subsequent to the releasing at 250.

The releasing at 250 may be accomplished in any suitable manner. As an example, the releasing at 250 may include translating the fastener alignment tool in a release direction and/or along a release trajectory. This translating may occur while each fastener contacts the corresponding fastening location and may translate, or transition, each fastener from the retained orientation to the received orientation. The releasing at 250 further may include separating the fastener alignment tool from the plurality of fasteners while maintaining operative engagement between the plurality of fasteners and the corresponding fastening locations.

Each fastener in the plurality of fasteners may be released with any suitable timing and/or sequencing during the releasing at 250. As examples, the releasing at 250 may include simultaneously releasing the plurality of fasteners, progressively releasing the plurality of fasteners, sequentially releasing at least two fasteners in the plurality of fasteners, and/or releasing the plurality of fasteners responsive to a single, a linear, an arcuate, and/or a rotational motion of the fastener alignment tool relative to the plurality of fastening locations.

Figure 14:
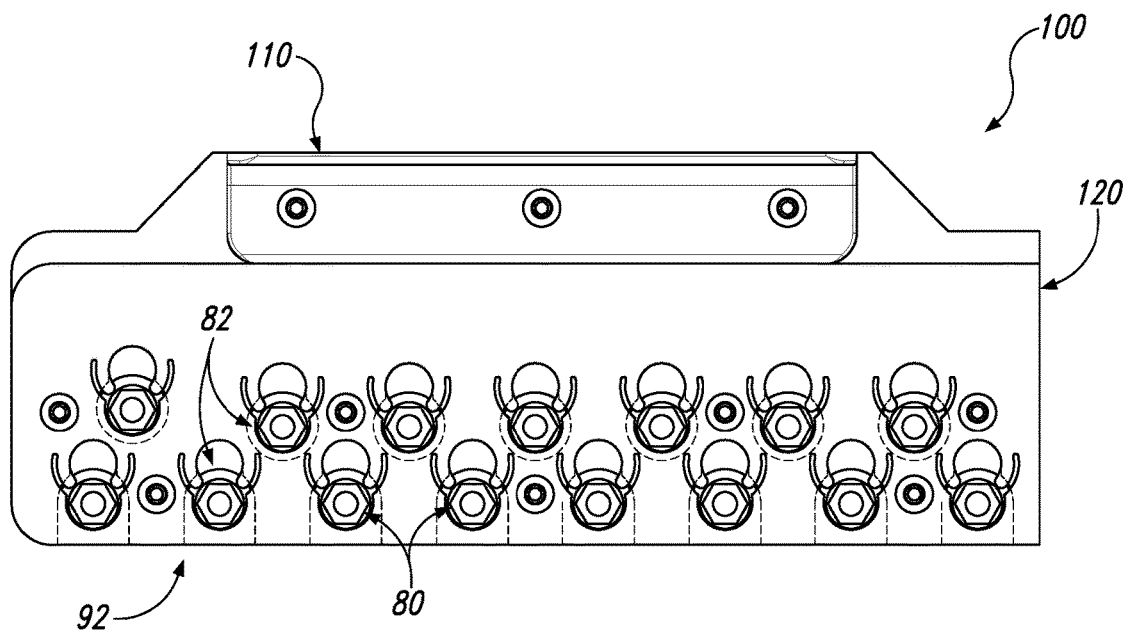
FIG. 14 is an illustration of a portion of the method of FIG. 9.
Figure 15:
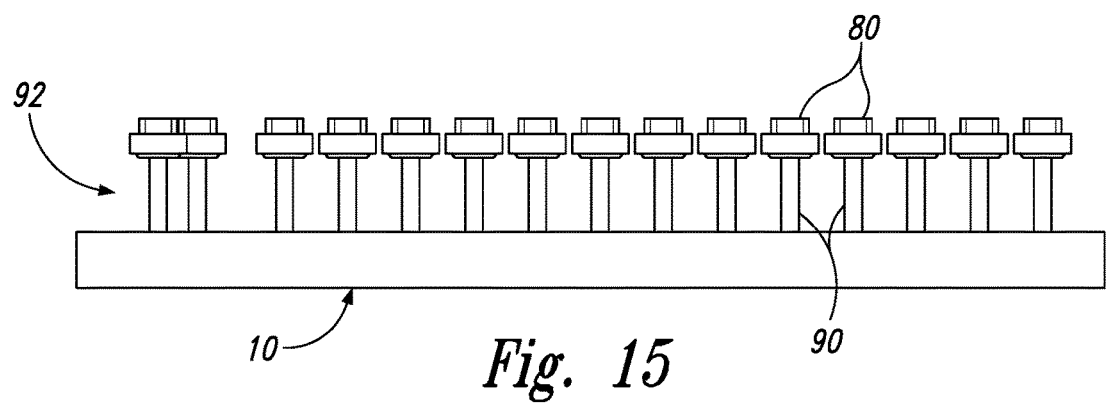
FIG. 15 is an illustration of a portion of the method of FIG. 9.
Figure 16:
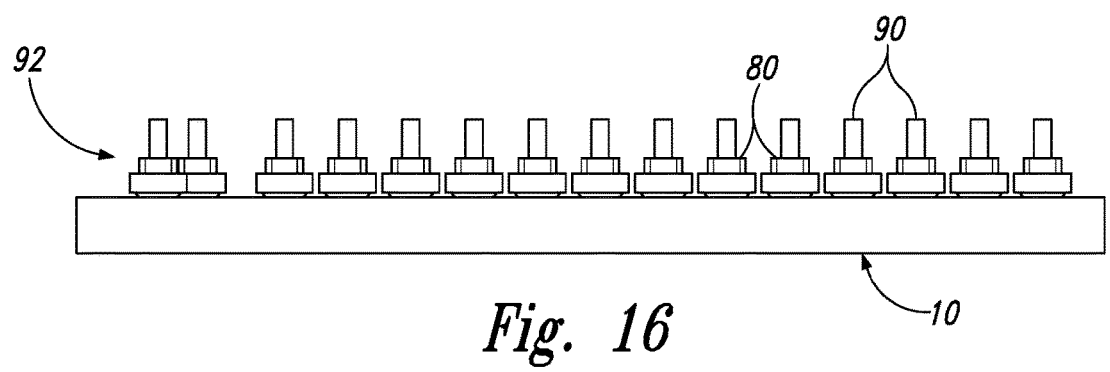
FIG. 16 is an illustration of a portion of the method of FIG. 9.

The releasing at 250 is illustrated by the transition from FIG. 12, in which each fastener 80 is in retained orientation 84, to FIG. 14, in which each fastener 80 is in received orientation 82. Subsequently, and as illustrated in FIG. 15, the fastener alignment tool may be separated from the plurality of fasteners while maintaining operative engagement between fasteners 80 and fastening locations 90.

Illustrative, non-exclusive examples of inventive subject matter according to the present disclosure are described in the following enumerated paragraphs:

A1. A fastener alignment tool configured to operatively engage a plurality of fasteners with a corresponding plurality of fastening locations arranged in a predetermined fastening location pattern on a structure, the fastener alignment tool comprising:

optionally a gripping region configured to be operatively gripped by a user of the fastener alignment tool; and an alignment tool body defining a plurality of fastener-receiving regions arranged in a predetermined fastener-receiving region pattern, which corresponds to the predetermined fastening location pattern, wherein each fastener-receiving region in the plurality of fastener-receiving regions is configured to receive and retain a corresponding fastener of the plurality of fasteners and includes:

(i) a fastener receptacle configured to receive the corresponding fastener at a received orientation relative to the alignment tool body; and (ii) a fastener retention structure configured to retain the corresponding fastener within the fastener-receiving region at a retained orientation relative to the alignment tool body, wherein the received orientation is distinct from the retained orientation.

A2. The fastener alignment tool of paragraph A1, wherein the alignment tool body is an assembly of a plurality of distinct alignment tool body components including at least:

(i) a first component, which defines a first portion of each fastener-receiving region; and (ii) a second component, which defines a second portion of each fastener-receiving region.

A3. The fastener alignment tool of paragraph A2, wherein the alignment tool body further includes a plurality of body couplers that operatively attaches the first component and the second component, and optionally at least one spacer, to one another.

A4. The fastener alignment tool of any of paragraphs A2-A3, wherein:

(i) the first component is defined by a first sheet material that defines two opposed first sheet material surfaces;

(ii) the first portion of each fastener-receiving region extends between the two opposed first sheet material surfaces;

(iii) the second component is defined by a second sheet material that defines two opposed second sheet material surfaces; and (iv) the second portion of each fastener-receiving region extends between the two opposed second sheet material surfaces.

A5. The fastener alignment tool of paragraph A4, wherein the two opposed first sheet material surfaces and the two opposed second sheet material surfaces are parallel, or at least substantially parallel, to one another within the alignment tool body.

A6. The fastener alignment tool of any of paragraphs A2-A5, wherein the alignment tool body further includes at least one spacer extending between the first component and the second component.

A7. The fastener alignment tool of paragraph A6, wherein the at least one spacer is configured to maintain the first component and the second component spaced-apart from one another.

A8. The fastener alignment tool of any of paragraphs A6-A7, wherein the plurality of fasteners includes a plurality of flange nuts, and further wherein each flange nut in the plurality of flange nuts includes:

(i) a threaded receptacle;

(ii) a nut region surrounding the threaded receptacle; and (ii) a flange region that extends from the nut region and defines a flange thickness.

A9. The fastener alignment tool of paragraph A8, wherein an average distance between the first component and the second component is at least one of:

(i) greater than the flange thickness;

(ii) at least equal to the flange thickness;

(iii) at least 105% of the flange thickness;

(iv) at least 110% of the flange thickness;

(v) at least 115% of the flange thickness;

(vi) at most 125% of the flange thickness;

(vii) at most 120% of the flange thickness;

(viii) at most 115% of the flange thickness; and (ix) at most 110% of the flange thickness.

A10. The fastener alignment tool of any of paragraphs A8-A9, wherein:

(i) the first portion of each fastener-receiving region defines a first portion of the fastener receptacle and a first portion of the fastener retention structure; and (ii) wherein the second portion of each fastener-receiving region defines a second portion of the fastener receptacle and a second portion of the fastener retention structure.

A11. The fastener alignment tool of paragraph A10, wherein the first portion of the fastener receptacle is sized to receive both the nut region and the flange region of the flange nut.

A12. The fastener alignment tool of any of paragraphs A10-A11, wherein the second portion of the fastener receptacle is sized to receive the nut region of the flange nut and to resist motion of the flange region of the flange nut therethrough.

A13. The fastener alignment tool of any of paragraphs A10-A12, wherein the first portion of the fastener retention structure is sized to permit access to the threaded receptacle and to resist motion of the flange region of the flange nut therethrough.

A14. The fastener alignment tool of any of paragraphs A10-A13, wherein the second portion of the fastener retention structure is sized to receive the nut region of the flange nut and to resist motion of the flange region of the flange nut therethrough.

A15. The fastener alignment tool of any of paragraphs A10-A14, wherein at least one of the first portion of the fastener retention structure and the second portion of the fastener retention structure is sized to at least partially deform, or flex, as the flange nut transitions between the received orientation and the retained orientation.

A16. The fastener alignment tool of any of paragraphs A10-A15, wherein the second portion of the fastener retention structure includes a pair of opposed flexible clips that at least one of:

(i) deforms, or flexes, as the flange nut transitions between the received orientation and the retained orientation; and (ii) defines a minimum separation distance that is less than a width of the nut region that passes therebetween as the flange nut transitions between the received orientation and the retained orientation.

A17. The fastener alignment tool of any of paragraphs A2-A16, wherein at least one of:

(i) the first component is a unitary first component; and (ii) the second component is a unitary second component.

A18. The fastener alignment tool of any of paragraphs A1-A17, wherein the alignment tool body is a unitary alignment tool body.

A19. The fastener alignment tool of any of paragraphs A1-A18, wherein the alignment tool body is formed via at least one of:
  (i) a machining operation;
  (ii) an additive manufacturing operation; and
  (iii) a water jet cutting operation.

A20. The fastener alignment tool of any of paragraphs A1-A19, wherein the alignment tool body is formed from at least one of:
  (i) a polymeric material;
  (ii) a metallic material;
  (iii) a resilient material;
  (iv) a stiff material;
  (v) a low-friction material;
  (vi) a polyethylene; and
  (vii) ultra-high-molecular-weight polyethylene.

A21. The fastener alignment tool of any of paragraphs A1-A20, wherein the plurality of fastener-receiving regions includes at least one of at least 5, at least 10, at least 20, at least 30, at least 40, at least 50, at least 60, at least 70, at least 80, at most 200, at most 180, at most 160, at most 140, at most 120, at most 100, at most 80, or at most 60 distinct fastener-receiving regions.

A22. The fastener alignment tool of any of paragraphs A1-A21, wherein each fastener-receiving region is coplanar, or at least substantially coplanar, with each other fastener-receiving region in the plurality of fastener-receiving regions.

A23. The fastener alignment tool of any of paragraphs A1-A22, wherein the fastener receptacle of each fastener-receiving region is coplanar, or at least substantially coplanar, with the fastener receptacle of each other fastener-receiving region in the plurality of fastener-receiving regions.

A24. The fastener alignment tool of any of paragraphs A1-A23, wherein the received orientation of each fastener in the plurality of fasteners is coplanar, or at least substantially coplanar, with the received orientation of each other fastener in the plurality of fasteners.

A25. The fastener alignment tool of any of paragraphs A1-A24, wherein the retained orientation of each fastener in the plurality of fasteners is coplanar, or at least substantially coplanar, with the retained orientation of each other fastener in the plurality of fasteners.

A26. The fastener alignment tool of any of paragraphs A1-A25, wherein the alignment tool body defines a structure-facing surface that faces toward the structure when the fastener alignment tool operatively engages the plurality of fasteners with the corresponding plurality of fastening locations, and further wherein the fastener receptacle includes a fastener receptacle opening that is defined by the structure-facing surface.

A27. The fastener alignment tool of any of paragraphs A1-A26, wherein the fastener retention structure is configured to operatively engage with the corresponding fastener as the corresponding fastener transitions from the received orientation to the retained orientation.

A28. The fastener alignment tool of any of paragraphs A1-A27, wherein the fastener retention structure is configured to deform, or flex, to permit the corresponding fastener to transition from the received orientation to the retained orientation.

A29. The fastener alignment tool of any of paragraphs A1-A28, wherein the fastener retention structure includes at least one resilient tab, or clip, and optionally two opposed resilient tabs, or clips.

A30. The fastener alignment tool of any of paragraphs A1-A29, wherein the fastener retention structure is configured to frictionally retain the corresponding fastener in the retained orientation.

A31. The fastener alignment tool of any of paragraphs A1-A30, wherein each fastener-receiving region of the plurality of fastener-receiving regions defines a corresponding fastener trajectory that the corresponding fastener follows upon transitioning between the received orientation and the retained orientation, and further wherein at least one of:
  (i) the corresponding fastener trajectory of each fastener-receiving region is parallel, or at least substantially parallel, to the corresponding fastener trajectory of each other fastener-receiving region in the plurality of fastener-receiving regions; and
  (ii) a length of the corresponding fastener trajectory is equal, or at least substantially equal, for each fastener-receiving region.

A32. The fastener alignment tool of any of paragraphs A1-A31, wherein each fastener-receiving region further includes a rotation-inducing structure configured to rotate the corresponding fastener when the corresponding fastener transitions between the retained orientation and the received orientation.

A33. The fastener alignment tool of paragraph A32, wherein the rotation-inducing structure includes a rotation-inducing surface that frictionally engages the corresponding fastener as the corresponding fastener transitions between the retained orientation and the received orientation.

A34. The fastener alignment tool of any of paragraphs A32-A33, wherein the rotation-inducing structure includes at least one of:
  (i) a roughened surface;
  (ii) a rubber surface; and
  (iii) a high-friction surface.

A35. The fastener alignment tool of any of paragraphs A32-A34, wherein each fastener-receiving region further includes a low-friction surface that operatively engages the corresponding fastener as the corresponding fastener transitions between the retained orientation and the received orientation.

A36. The fastener alignment tool of paragraph A35, wherein the low-friction surface and the rotation-inducing structure are on opposed sides of the corresponding fastener as the corresponding fastener transitions between the retained orientation and the received orientation.

A37. The fastener alignment tool of any of paragraphs A35-A36, wherein the low-friction surface includes at least one of a smooth surface and a hard surface.

A38. The fastener alignment tool of any of paragraphs A1-A37, wherein the gripping region at least one of:
  (i) is operatively attached to the alignment tool body;
  (ii) extends from the alignment tool body; and
  (iii) is defined by the alignment tool body.

A39. The fastener alignment tool of any of paragraphs A1-A38, in combination with the structure.

A40. The fastener alignment tool of paragraph A39, wherein the structure includes at least one of:
  (i) an aircraft;
  (ii) a portion of the aircraft;
  (iii) a wing of the aircraft; and
  (iv) an airframe of the aircraft.

A41. The fastener alignment tool of any of paragraphs A1-A40, wherein the plurality of fasteners includes at least one of:
(i) a plurality of threaded fasteners;
(ii) a plurality of nuts;
(iii) a plurality of flange nuts;
(iv) a plurality of bolts; and
(v) a plurality of flange bolts.

A42. The fastener alignment tool of any of paragraphs A1-A41, in combination with the plurality of fasteners.

A43. The fastener alignment tool of any of paragraphs A1-A42, wherein the corresponding plurality of fastening locations includes at least one of:
(i) a plurality of threaded locations;
(ii) a plurality of posts;
(iii) a plurality of threaded studs;
(iv) a plurality of holes; and
(v) a plurality of threaded holes.

B1. A method of engaging a plurality of fasteners with a corresponding plurality of fastening locations arranged in a predetermined fastening location pattern on a structure, the method comprising:
positioning each fastener of the plurality of fasteners within a corresponding fastener-receiving region of a fastener alignment tool;
retaining each fastener within the corresponding fastener-receiving region;
orienting the fastener alignment tool relative to the plurality of fastening locations such that each fastener contacts a corresponding fastening location of the plurality of fastening locations; and
releasing each fastener in the plurality of fasteners from the corresponding fastener-receiving region such that each fastener remains engaged with the corresponding fastening location, optionally wherein the releasing includes at least one of:
(i) simultaneously releasing the plurality of fasteners;
(ii) progressively releasing the plurality of fasteners;
(iii) sequentially releasing at least two fasteners in the plurality of fasteners; and
(iv) releasing the plurality of fasteners responsive to at least one of a single motion, a linear motion, an arcuate motion, and a rotational motion of the fastener alignment tool relative to the plurality of fastening locations.

B2. The method of paragraph B1, wherein the positioning includes positioning each fastener within a corresponding fastener receptacle of the corresponding fastener-receiving region and at a received orientation relative to the fastener alignment tool.

B3. The method of any of paragraphs B1-B2, wherein the retaining includes operatively translating each fastener, within the fastener alignment tool, from the received orientation to a retained orientation relative to the fastener alignment tool, which is distinct from the received orientation, optionally to frictionally retain each fastener with a corresponding fastener retention structure of the corresponding fastener-receiving region.

B4. The method of paragraph B3, wherein the retaining includes deforming, or flexing, a/the corresponding fastener retention structure as each fastener transitions from the received orientation to the retained orientation.

B5. The method of any of paragraphs B1-B4, wherein the orienting includes at least one of:
(i) operatively engaging each fastener with the corresponding fastening location; and
(ii) at least partially coupling each fastener to the corresponding fastening location.

B6. The method of any of paragraphs B1-B5, wherein the simultaneously releasing includes translating the fastener alignment tool in a release direction, while each fastener contacts the corresponding fastening location, to translate each fastener from a/the retained orientation to a/the received orientation.

B7. The method of any of paragraphs B1-B6, wherein, subsequent to the orienting and prior to the simultaneously releasing, the method further includes rotating each fastener to engage each fastener with the corresponding fastening location.

B8. The method of paragraph B7, wherein the rotating includes tightening each fastener to a predetermined torque.

B9. The method of any of paragraphs B1-B8, wherein the fastener alignment tool includes any suitable structure of any of the fastener alignment tools of any of paragraphs A1-A43.

The fastener alignment tools disclosed herein are described as operatively engaging a plurality of fasteners with a corresponding plurality of fastening locations. It is within the scope of the present disclosure that the disclosed fastener alignment tools additionally or alternatively may be configured to operatively engage a single fastener with a single, or a specified, fastening location. With this in mind, and throughout the specification and claims, the phrase, "plurality of fasteners" may be replaced with the word, "fastener." Similarly, the phrase, "plurality of fastening locations" may be replaced with the phrase, "fastening location." In addition, the phrase, "plurality of fastener-receiving regions" may be replaced with "fastener-receiving region." Other changes to and/or interpretations of the specification and claims that are consistent with the interpretation of the fastener alignment tool as being utilized to operatively engage a single fastener with a single fastening location are within the scope of the present disclosure. Corresponding changes to the disclosed methods also are within the scope of the present disclosure.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/ or methods, are also within the scope of the present disclosure.

The invention claimed is:

1. A fastener alignment tool configured to operatively engage a plurality of fasteners with a corresponding plurality of fastening locations arranged in a predetermined fastening location pattern on a structure, the fastener alignment tool comprising:
   a gripping region configured to be operatively gripped by a user of the fastener alignment tool; and
   an alignment tool body defining a plurality of fastener-receiving regions arranged in a predetermined fastener-receiving region pattern, which corresponds to the predetermined fastening location pattern, wherein each fastener-receiving region in the plurality of fastener-receiving regions is configured to receive and retain a corresponding fastener of the plurality of fasteners and includes:
   (i) a fastener receptacle configured to receive the corresponding fastener at a received orientation relative to the alignment tool body; and
   (ii) a fastener retention structure configured to retain the corresponding fastener within the fastener-receiving region at a retained orientation relative to the alignment tool body, wherein the received orientation is distinct from the retained orientation;
   wherein the alignment tool body is an assembly of a plurality of distinct alignment tool body components including at least:
   (i) a first component, which defines a first portion of each fastener-receiving region; and
   (ii) a second component, which defines a second portion of each fastener-receiving region;
   wherein the alignment tool body further includes at least one spacer extending between the first component and the second component, wherein the at least one spacer is configured to maintain the first component and the second component spaced-apart from one another; and
   further wherein an average distance between the first component and the second component is sized to permit a flange region of a flange nut to be received between the first component and the second component.

2. The fastener alignment tool of claim 1, wherein the alignment tool body further includes a plurality of body couplers that operatively attaches the first component and the second component to one another.

3. The fastener alignment tool of claim 1, wherein:
   (i) the first component is defined by a first sheet material that defines two opposed first sheet material surfaces;
   (ii) the first portion of each fastener-receiving region extends between the two opposed first sheet material surfaces;
   (iii) the second component is defined by a second sheet material that defines two opposed second sheet material surfaces; and
   (iv) the second portion of each fastener-receiving region extends between the two opposed second sheet material surfaces.

4. The fastener alignment tool of claim 3, wherein the two opposed first sheet material surfaces and the two opposed second sheet material surfaces are parallel to one another within the alignment tool body.

5. The fastener alignment tool of claim 1, wherein the fastener alignment tool includes the plurality of fasteners, wherein the plurality of fasteners includes a plurality of flange nuts, wherein each flange nut in the plurality of flange nuts includes:
   (i) a threaded receptacle;
   (ii) a nut region surrounding the threaded receptacle; and
   (iii) a flange region that extends from the nut region and defines a flange thickness and
   further wherein an average distance between the first component and the second component is greater than the flange thickness.

6. The fastener alignment tool of claim 5, wherein:
   (i) the first portion of each fastener-receiving region defines a first portion of the fastener receptacle and a first portion of the fastener retention structure; and (ii) wherein the second portion of each fastener-receiving region defines a second portion of the fastener receptacle and a second portion of the fastener retention structure.

7. The fastener alignment tool of claim 6, wherein:
(i) the first portion of the fastener receptacle is sized to receive both the nut region and the flange region of the flange nut;
(ii) the second portion of the fastener receptacle is sized to receive the nut region of the flange nut and to resist motion of the flange region of the flange nut therethrough;
(iii) the first portion of the fastener retention structure is sized to permit access to the threaded receptacle and to resist motion of the flange region of the flange nut therethrough; and
(iv) the second portion of the fastener retention structure is sized to receive the nut region of the flange nut and to resist motion of the flange region of the flange nut therethrough.

8. The fastener alignment tool of claim 6, wherein at least one of the first portion of the fastener retention structure and the second portion of the fastener retention structure is sized to at least partially flex as the flange nut transitions between the received orientation and the retained orientation.

9. The fastener alignment tool of claim 6, wherein the second portion of the fastener retention structure includes a pair of opposed flexible clips that at least one of:
(i) flexes as the flange nut transitions between the received orientation and the retained orientation; and
(ii) defines a minimum separation distance that is less than a width of the nut region that passes therebetween as the flange nut transitions between the received orientation and the retained orientation.

10. The fastener alignment tool of claim 1, wherein at least one of:
(i) each fastener-receiving region is coplanar with each other fastener-receiving region in the plurality of fastener-receiving regions;
(ii) the fastener receptacle of each fastener-receiving region is coplanar with the fastener receptacle of each other fastener-receiving region in the plurality of fastener-receiving regions;
(iii) the received orientation of each fastener in the plurality of fasteners is coplanar with the received orientation of each other fastener in the plurality of fasteners; and
(iv) the retained orientation of each fastener in the plurality of fasteners is coplanar with the retained orientation of each other fastener in the plurality of fasteners.

11. The fastener alignment tool of claim 1, wherein the alignment tool body defines a structure-facing surface that faces toward the structure when the fastener alignment tool operatively engages the plurality of fasteners with the corresponding plurality of fastening locations, and further wherein the fastener receptacle includes a fastener receptacle opening that is defined by the structure-facing surface.

12. The fastener alignment tool of claim 1, wherein at least one of:
(i) the fastener retention structure is configured to operatively engage with the corresponding fastener as the corresponding fastener transitions from the received orientation to the retained orientation;
(ii) the fastener retention structure is configured to flex to permit the corresponding fastener to transition from the received orientation to the retained orientation; and
(iii) the fastener retention structure is configured to frictionally retain the corresponding fastener in the retained orientation.

13. The fastener alignment tool of claim 1, wherein the fastener retention structure includes at least one resilient clip.

14. The fastener alignment tool of claim 1, wherein each fastener-receiving region further includes a rotation-inducing structure configured to rotate the corresponding fastener when the corresponding fastener transitions between the retained orientation and the received orientation.

15. The fastener alignment tool of claim 14, wherein the rotation-inducing structure includes a rotation-inducing surface that frictionally engages the corresponding fastener as the corresponding fastener transitions between the retained orientation and the received orientation.

16. The fastener alignment tool of claim 1, in combination with the structure, wherein the structure includes at least one of:
(i) an aircraft;
(ii) a portion of the aircraft;
(iii) a wing of the aircraft; and
(iv) an airframe of the aircraft.

17. A method of engaging a plurality of fasteners with a corresponding plurality of fastening locations arranged in a predetermined fastening location pattern on a structure, the method comprising:
positioning each fastener of the plurality of fasteners within a corresponding fastener-receiving region of a fastener alignment tool;
retaining each fastener within the corresponding fastener-receiving region;
orienting the fastener alignment tool relative to the plurality of fastening locations such that each fastener contacts a corresponding fastening location of the plurality of fastening locations; and
simultaneously releasing each fastener in the plurality of fasteners from the corresponding fastener-receiving region such that each fastener remains engaged with the corresponding fastening location;
wherein the positioning includes positioning each fastener at a received orientation within the corresponding fastener-receiving region;
wherein the retaining includes transitioning each fastener to a retained orientation within the corresponding fastener-receiving region;
wherein each fastener-receiving region of a plurality of fastener-receiving regions defines a corresponding fastener trajectory that the corresponding fastener follows upon transitioning between the received orientation and the retained orientation;
wherein the corresponding fastener trajectory of each fastener-receiving region is parallel to the corresponding fastener trajectory of each other fastener-receiving region in the plurality of fastener-receiving regions; and
wherein the simultaneously releasing includes simultaneously translating each fastener along the corresponding fastener trajectory.

18. A fastener alignment tool configured to operatively engage a plurality of fasteners with a corresponding plurality of fastening locations arranged in a predetermined fastening location pattern on a structure, the fastener alignment tool comprising:
a gripping region configured to be operatively gripped by a user of the fastener alignment tool; and an alignment tool body defining a plurality of fastener-receiving regions arranged in a predetermined fastener-receiving region pattern, which corresponds to the predetermined fastening location pattern, wherein each fastener-receiving region in the plurality of fastener-receiving regions is configured to receive and retain a corresponding fastener of the plurality of fasteners and includes:
(i) a fastener receptacle configured to receive the corresponding fastener at a received orientation relative to the alignment tool body; and
(ii) a fastener retention structure configured to retain the corresponding fastener within the fastener-receiving region at a retained orientation relative to the alignment tool body, wherein the received orientation is distinct from the retained orientation;
wherein the alignment tool body is an assembly of a plurality of distinct alignment tool body components including at least:
(i) a first component, which defines a first portion of each fastener-receiving region; and
(ii) a second component, which defines a second portion of each fastener-receiving region;
wherein the alignment tool body further includes at least one spacer extending between the first component and the second component, wherein the at least one spacer is configured to maintain the first component and the second component spaced-apart from one another;
wherein the fastener alignment tool includes the plurality of fasteners, wherein the plurality of fasteners includes a plurality of flange nuts, wherein each flange nut in the plurality of flange nuts includes:
(i) a threaded receptacle;
(ii) a nut region surrounding the threaded receptacle; and
(iii) a flange region that extends from the nut region and defines a flange thickness; and
further wherein an average distance between the first component and the second component is greater than the flange thickness.

19. The fastener alignment tool of claim 18, wherein:
(i) the first portion of each fastener-receiving region defines a first portion of the fastener receptacle and a first portion of the fastener retention structure; and
(ii) wherein the second portion of each fastener-receiving region defines a second portion of the fastener receptacle and a second portion of the fastener retention structure.

20. The fastener alignment tool of claim 19, wherein:
(i) the first portion of the fastener receptacle is sized to receive both the nut region and the flange region of a flange nut of the plurality of flange nuts;
(ii) the second portion of the fastener receptacle is sized to receive the nut region of the flange nut and to resist motion of the flange region of the flange nut therethrough;
(iii) the first portion of the fastener retention structure is sized to permit access to the threaded receptacle and to resist motion of the flange region of the flange nut therethrough; and
(iv) the second portion of the fastener retention structure is sized to receive the nut region of the flange nut and to resist motion of the flange region of the flange nut therethrough.

21. The fastener alignment tool of claim 19, wherein at least one of the first portion of the fastener retention structure and the second portion of the fastener retention structure is sized to at least partially flex as the flange nut transitions between the received orientation and the retained orientation.

22. The fastener alignment tool of claim 19, wherein the second portion of the fastener retention structure includes a pair of opposed flexible clips that at least one of:
(i) flexes as the flange nut transitions between the received orientation and the retained orientation; and
(ii) defines a minimum separation distance that is less than a width of the nut region that passes therebetween as the flange nut transitions between the received orientation and the retained orientation.

23. A fastener alignment tool configured to operatively engage a plurality of fasteners with a corresponding plurality of fastening locations arranged in a predetermined fastening location pattern on a structure, the fastener alignment tool comprising:
a gripping region configured to be operatively gripped by a user of the fastener alignment tool; and
an alignment tool body defining a plurality of fastener-receiving regions arranged in a predetermined fastener-receiving region pattern, which corresponds to the predetermined fastening location pattern, wherein each fastener-receiving region in the plurality of fastener-receiving regions is configured to receive and retain a corresponding fastener of the plurality of fasteners and includes:
(i) a fastener receptacle configured to receive the corresponding fastener at a received orientation relative to the alignment tool body; and
(ii) a fastener retention structure configured to retain the corresponding fastener within the fastener-receiving region at a retained orientation relative to the alignment tool body, wherein the received orientation is distinct from the retained orientation;
wherein each fastener-receiving region further includes a rotation-inducing structure configured to rotate the corresponding fastener when the corresponding fastener transitions between the retained orientation and the received orientation.

24. The fastener alignment tool of claim 23, wherein the rotation-inducing structure includes a rotation-inducing surface that frictionally engages the corresponding fastener as the corresponding fastener transitions between the retained orientation and the received orientation.

* * * * *